Dec. 26, 1967  A. LUSCHER  3,359,985
PERFORATED KEY WORD CARD
Filed Jan. 25, 1966  5 Sheets-Sheet 1

INVENTOR
ALFRED LUSCHER

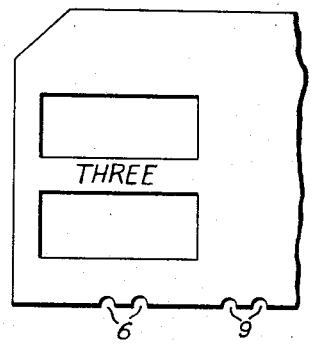
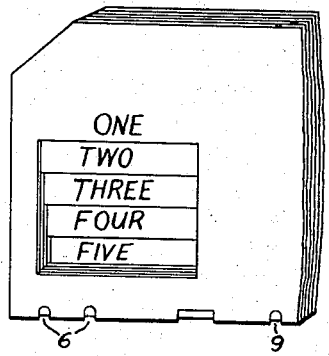
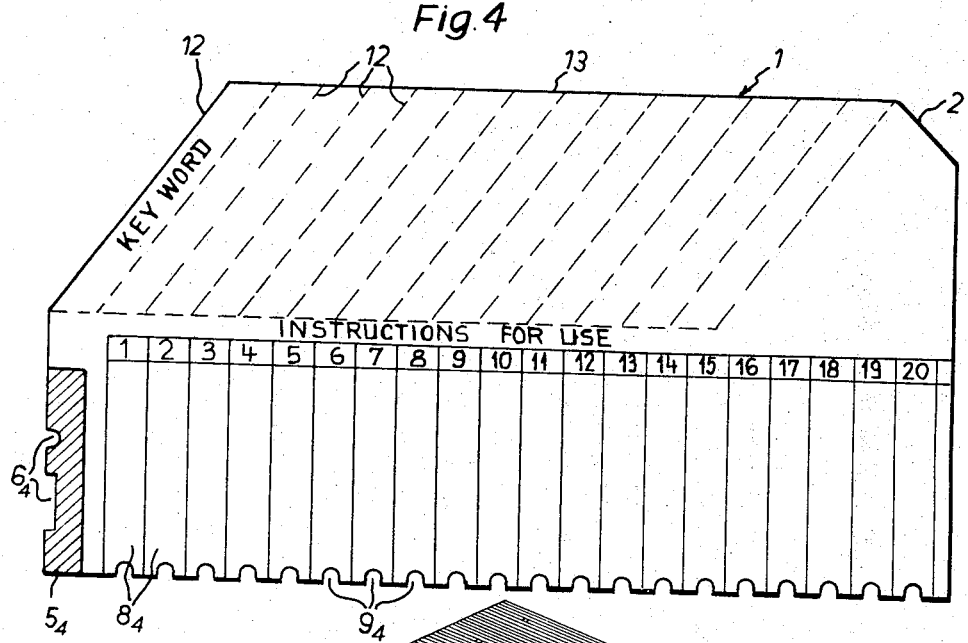
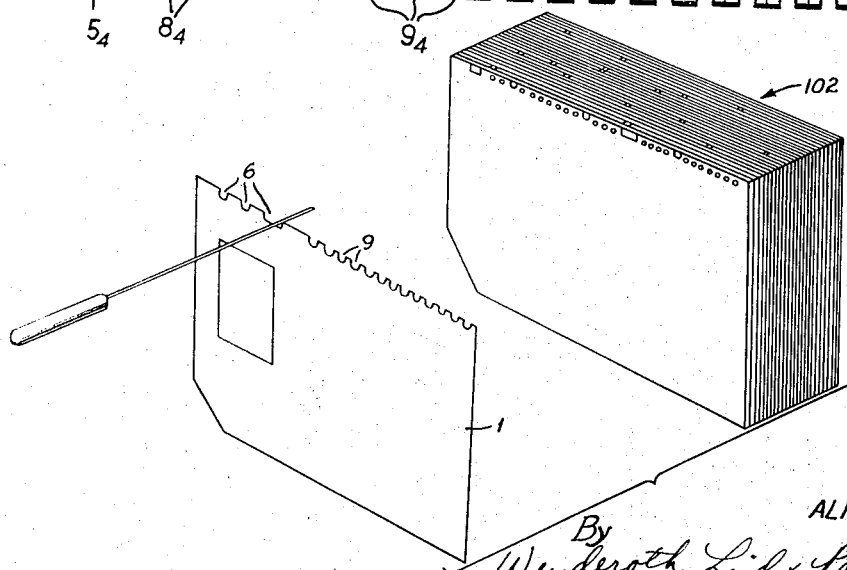

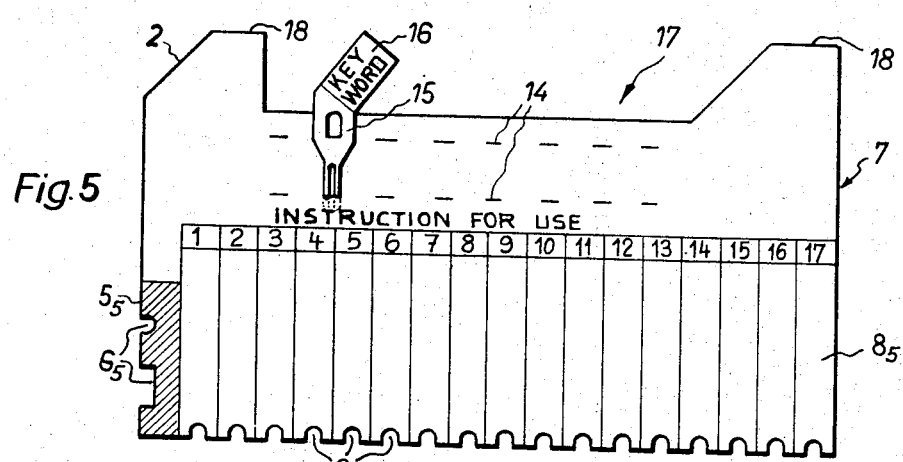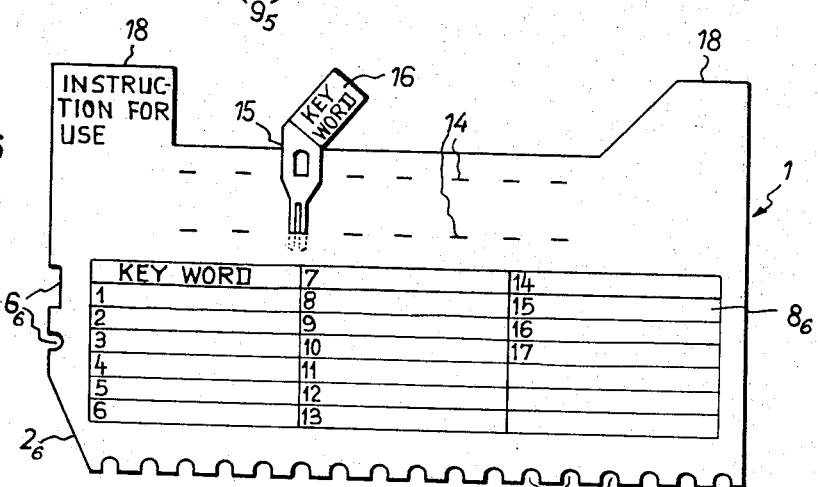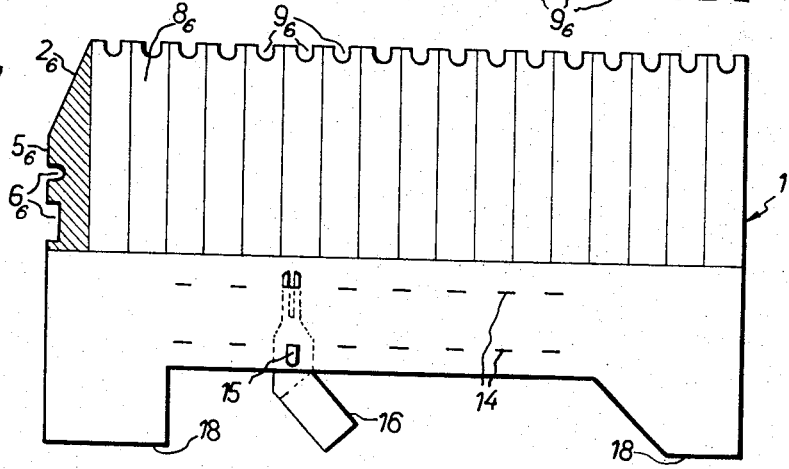

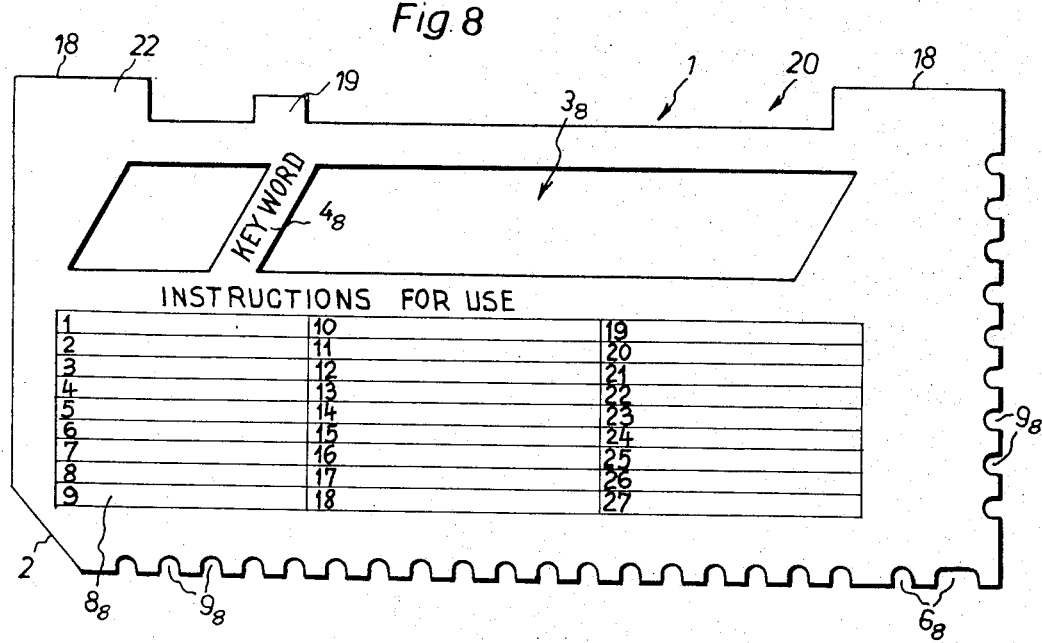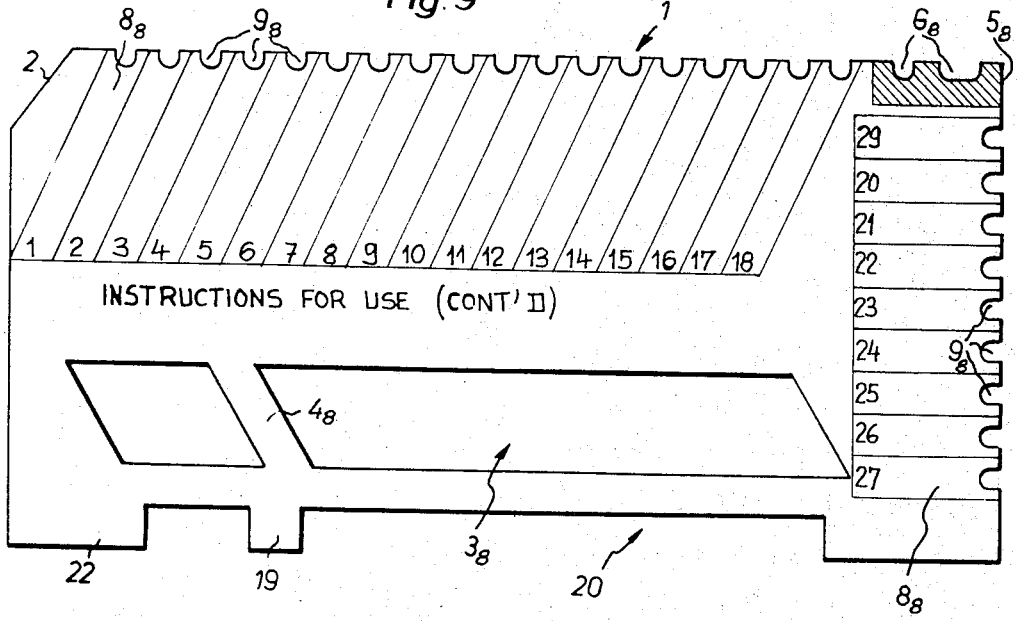

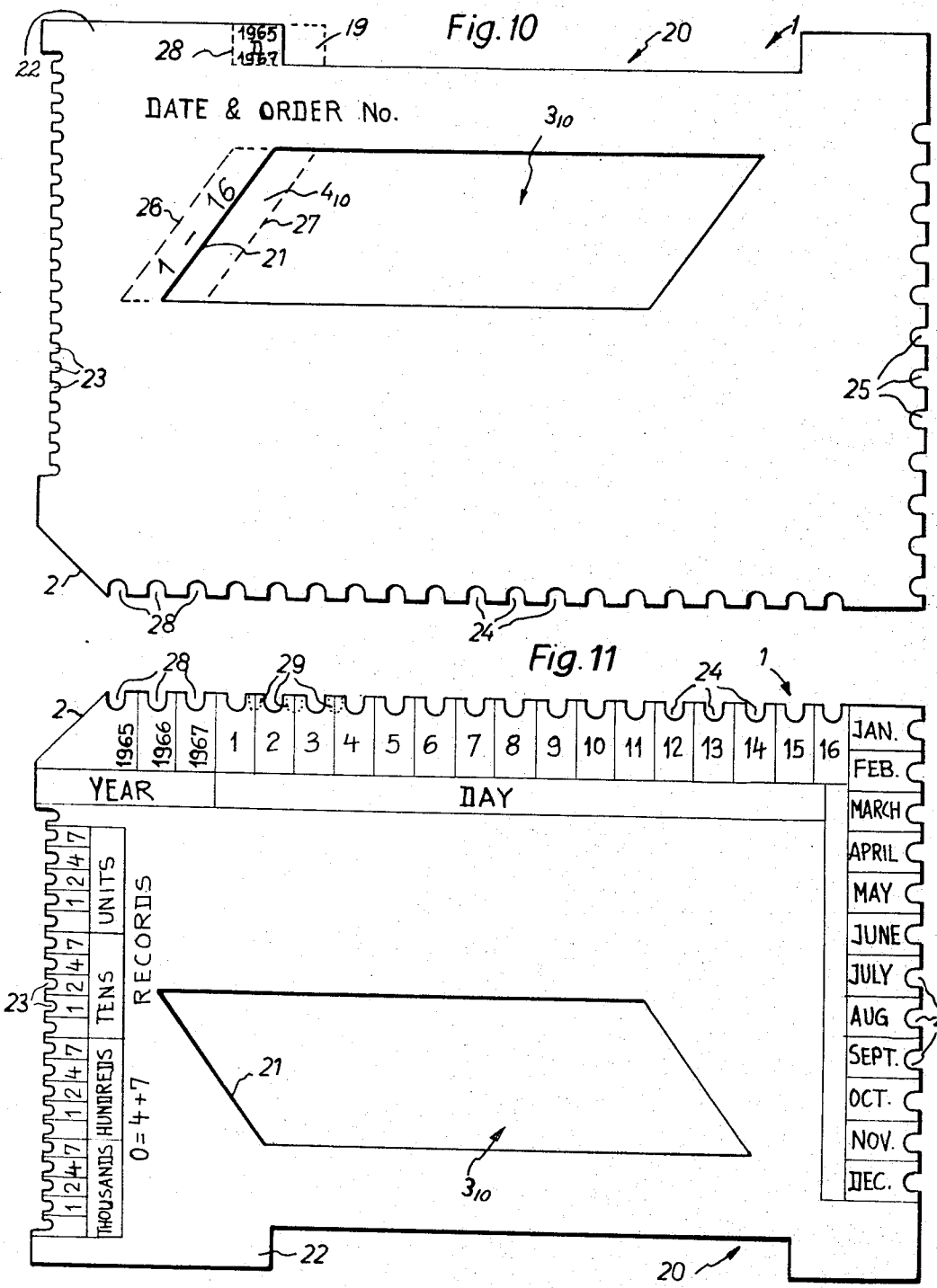

United States Patent Office 3,359,985
Patented Dec. 26, 1967

3,359,985
PERFORATED KEY WORD CARD
Alfred Luscher, Hergiswil, Switzerland, assignor to Dorec Verlags, A.-G., Hergiswil, Switzerland
Filed Jan. 25, 1966, Ser. No. 522,988
Claims priority, application Austria, Aug. 23, 1961, A 6,505/61
11 Claims. (Cl. 129—16.1)

The present application is a continuation-in-part of application Ser. No. 218,763, filed Aug. 22, 1962, now abandoned.

The invention relates to key word cards for use with file cards containing information under the key words of the key word cards and having perforations along their edge coded in accordance with the information contained on the card.

In the prior art, file cards are provided along one or more edge portions with one or more rows of uniformly spaced punched perforations, as is generally known. The key words which correspond with the information contained on the individual cards, are associated each with predetermined perforations which, at the edge portion of the card containing the particular information, are notches. Each card thus has marginal notches corresponding to the associated key word. The selection of a desired card is effected by means of a needle which is slipped through the hole, associated with the key word searched for, and moved through the entire pack of cards. When the pack is then lifted by means of the needle the desired card drops out owing to the provision of the marginal notch corresponding to that key word.

It will be understood that in this manner the desired file cards can be found within a very short time from a voluminous pack of such cards. Moreover, the file cards may be stacked in any desired sequence, without impairing in the least the reselection of a particular card.

In view of these extraordinary advantages, it is unfortunate that the system has the particular drawback that the arrangement of the marginal perforations is based on a precise keying or coding, that is, a series of perforations comprised of a combination of holes and notches that varies, according to the content of the card, so that the handling of the card file remains, after all, the exclusive privilege of the specialist versed in the coding system. This disadvantage results in the fact that the marginal perforation card file, which is extraordinarily well suited for the cataloguing of manuals, reference books, documentations and the like, actually cannot be used for such or similar purposes, since it cannot be expected that the subscribers of such publications would acquaint themselves with the specific coding scheme.

It is an object of the invention to provide a key word card for use with file cards of the above kind and which obviates the necessity for knowing the coding scheme employed.

This and other objects of the invention will be apparent from the following detailed description, with reference to the accompanying drawings diagrammatically illustrating, by way of example, several embodiment of the invention, and in which:

FIGURES 4 and 5 illustrate two further embodiments of a key word card according to the invention;

FIGURES 6 and 7 are front and rear views, respectively, of a variation of the form of key word card illustrated in FIGURE 5;

FIGURES 8 and 9 are front and rear views of a still further embodiment of a key word card according to the invention;

FIGURES 10 and 11 show a particular application of the embodiment of the key word cards shown in FIGURES 8 and 9;

FIGS. 12a–12c show successive key word cards in a set of key word cards;

FIG. 12d shows a stack of the set of key word cards of which the cards of FIGS. 12a–12c form the first three cards; and FIG. 13 is a perspective view of a pack of cards consisting of a series of unsorted file cards.

Figure 1:
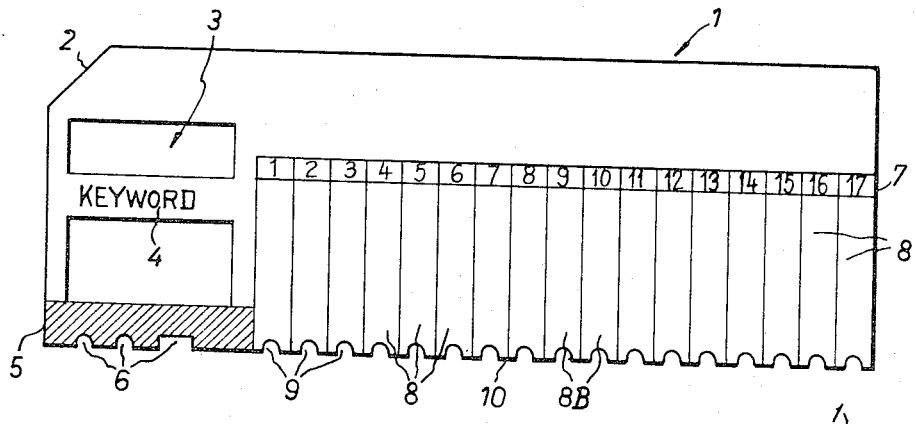
FIGURES 1, 2 and 3 show variations of one form of a key word card according to the invention.
Figure 12A:
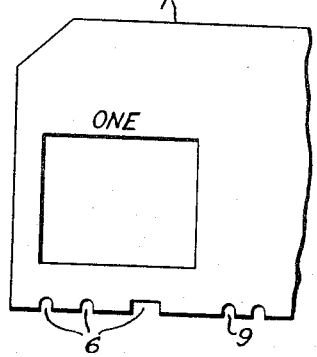
Figure 12B:
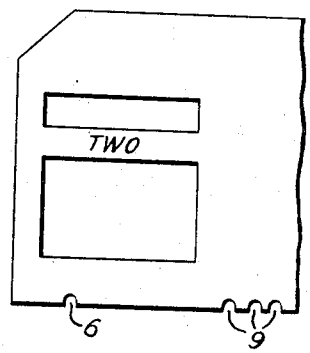

Referring to FIGURES 1, 12 and 13, a first embodiment of the invention comprises the card 1 itself, having one corner 2 clipped which is to be matched with the clipped corners of the pack of file cards 102 shown in FIG. 13, to ensure that a key word card is correctly positioned in front of the pack. The key word card is provided at one end with a window 3 traversed by a dividing member 4 which has indicated thereupon the key word of the card. The dividing member 4 of the key word cards of the same series, three of which are shown in FIGS. 12a–12c, each occupy a unique position across the window 3, whereby the key word cards of a series can be randomly stacked, yet the key word of each card will be immediately visible through the aligned windows, as shown in FIG. 12d. Immediately below the window is an area 5 differentiated from the rest of the card, or visually indicated in any suitable manner, such as shading, as shown, coloring, etc., and containing one or more notches 6, which correspond to the key word of that card and perforce comprise a unique pattern as compared to the other key word cards of the series. Next to the window 3 and extending to the opposite end 7 of the card area are a series of numbered vertical rectangular spaces 8 that terminate each in a notch 9 at the lower edge 10 of the card. Each space 8 can have indicated therein a subheading under the key word, the notch 9 for that subheading being located at the lower end of the space. It will be understood with this and the succeeding embodiments that the cards can be supplied with the spaces 8 filled in, the key word cards being intended for a prepared file card system, or left blank, for the user to prepare his own file card system.

If by way of example we suppose that the key word is *Thermoplastics*, the subheadings on the card in the series of key word cards could be devoted to specific thermoplastics: *polyamides, polyethylenes, polypropylenes,* etc. The key word of a second card 1 of the same series may be *Fabrication of Synthetic Plastics*, having such subheadings as *injection molding, extrusion, laminating, vacuum forming*, etc.

In explaining the use of the invention we shall suppose that we seek information on the extrusion of polyamides. In the stack of key word cards we visually find the two cards appropriate to our search. One of the cards, for instance the card "one" of FIG. 12a, (we shall assume that card having the key word *Thermoplastics* being employed first) is turned upside down and placed in front of the pack 102 of file cards, notched corners matching as shown in FIG. 13; and a needle, as is well known in the art, is inserted through the card file perforations aligned with the one or more notches 6. Those cards of the file pack remaining after this step are all those cards containing information on thermoplastics. Being interested, however, only in polyamides, we place the same key word card "one" in front of these remaining cards and insert the needle through those perforations of the file cards aligned with the notch 9 of the space 8 entitled *polyamides*. The perforations of file cards having information on polyamides being also notches, the cards that remain after this second step will be all those cards of the original stack relating to this thermoplastic. Having proceeded this far, we substitute the second key word card "two" for the first. With the second key word card, which is for the keyword *Fabrication of Synthetic Plastics,* we insert the needle through the notch 6, after having placed the card over the file cards relating to polyamides, and then through the file card perforations aligned with the notch 9 of the space marked *extrusion*. These steps completed, we are in possession of all file cards descriptive of what we originally sought.

If we should be interested in the extrusion of only a certain polyamide, and not wish to sort out from the cards obtained above the one or more relating to the single polyamide, we have either the possibility of increasing the number of spaces 8 to permit the listing of individual polyamides, polyethylenes, etc., or of employing a third key word card having the key word *polyamides* and for its subheadings individual synthetic plastics falling under this heading.

The number of spaces 8 can be increased by giving the same key word over to two or more cards.

Alternatively, the number of spaces 8 per card can be doubled by continuing the spaces the full height of the card and dividing each space 8 into two spaces.

As is apparent from the above example, the key word cards of the invention, requiring no knowledge of the coding scheme employed, are used in an extraordinarily simple manner. A few words of simple instruction, which conveniently can be printed on each key word card, or on one such card of the same series, enables the rank novice to use the invention quickly and accurately from the very start.

Figure 2:
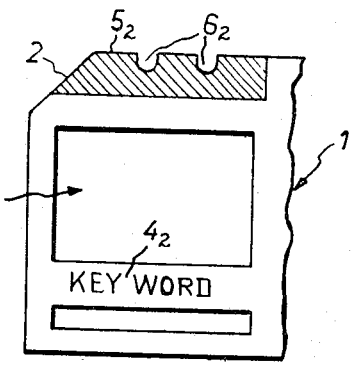
Figure 3:
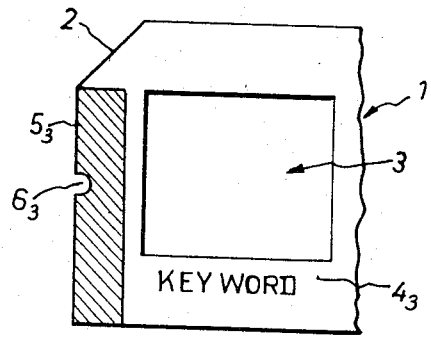

As shown at FIGURES 2 and 3, the position of the areas $5_2$ and $5_3$ are the notches $6_2$ and $6_3$ can occupy other positions with regard to the window 3 and can, as a matter of fact, be located on any unused portion of the card. This is advantageous where there is a large number of key word cards in a series, and is applicable to any embodiment of the invention.

In the succeeding embodiments, similar elements of the key word cards are similarly referenced.

FIGURE 4 illustrates a second form of the invention, having, once again, the area $5_4$ notches $6_4$ and $9_4$, spaces $8_4$ for the subheadings, and a clipped corner 2. The key word of a card is located along a slanting edge 12, which is located farther to the right for successive cards of a series, as indicated by the dashed lines 12.

With this form of the invention, it will be necessary, if one is to avoid going through a stack of the cards to find the desired key word card or cards, that be arranged in order of the location of their edge 12, whereby the edge with the key word indicated therealong is immediately visible.

A third embodiment of the invention, illustrated at FIGURE 5, is provided with a series of spaced slits 14 extending across part of the width of the card, for securing a clip of any suitable and known design, such as shown at 15, carrying a canted tab 16 upon which the key word is printed or written in. A cutout 17 is provided of sufficient depth to ensure that the tab 16 does not extend beyond the top edge 18 of the card. For every key word of a series, the clip 15 occupies a unique position along the length of the card. Thus, even though the cards of the series are randomly stacked, the key word of each card is visible.

In a variation, illustrated at FIGURES 6 and 7, which can be used in the same series with the cards of FIGURE 5, the notched corner $2_6$ is located at the lower left hand corner, when the card is in its normal position in the stack of key word cards. The face of the card has printed thereon the spaces $8_6$, which are not aligned with the notches $9_6$.

To use the card it is turned over to exhibit its rear face in the position shown at FIGURE 7, revealing the area $5_6$ and, once again, spaces $8_6$ which, however, are aligned each with a notch $9_6$.

Another form of the invention is illustrated at FIGURES 8 and 9, wherein the notches $9_8$ for the subheadings are distributed along two sides of the card. The arrangement of the card has the advantage that it permits of a longitudinal window $3_8$ admitting a larger number of possible unique positions for the transverse member 4 than is possible with the form of FIGURES 1–3. The card also possesses an integral tab 19 which can be marked to indicate, for example, a subseries of a series of key word cards, so that all cards of a subseries can be quickly assembled together, the member $4_9$, having thereon the key word of the respective card, occupying a position unique to that card of the subseries. Similarly, each tab 19 of each subseries occupies a position unique to that subseries in the series. Location of the tab 19 within a cutout 20 protects it from unnecessary wear and tear and permits standing the card on its normally upper edge 18, FIGURE 9. In use the card is turned over, as is the card of FIGURES 6 and 7, revealing the area $5_8$ and the spaces $8_8$ aligned with the notches $9_8$.

To convey an idea of the possible variations that can be played on the invention, there is shown, at FIGURES 10 and 11, a modification of the form of FIGURES 8 and 9, wherein three sides of the card are notched. The card is shown as it could be employed by a firm for the purpose of securing information on orders by date or number thereof.

The front face of the card 1 exhibits the key word *Date and Order No.* at the top, left; the inscription *1–16*, indicating the first 16 days of the month, located along the left edge 21 of the window $3_{10}$; a left hand shoulder 22, corresponding to that of FIGURES 8 and 9, but extended to the right a distance equal to the width of tab 19, and having thereon a *D*, for identifying the card, and the numerals *1965* and *1967,* which denote that the card covers the period from the beginning of 1965 through the end of 1967; and notches 23, 24, 25, 28 along the left, lower, and right edges of the card, FIGURE 10. The window $3_{10}$ of the next key word card, covering the concluding days of the month, would be extended to the left a distance equal to the width of a dividing member $4_{10}$ to terminate along the dashed line 26, the edges of the dividing member $4_{10}$ corresponding to the edge 21 of the previous card and dashed line 27. Similarly, the shoulder 22 of the next card retreats a distance equal to that of a tab 19, the tab of the next card occupying a position, shown in dashed line 28, immediately to the right of the shoulder of the card illustrated. The cards for all succeeding periods being similarly constructed, in a series of such cards stacked together the identifying tab 19 and dividing member 4 of each card are visible. If desired the entire key word also can be printed on the dividing member.

The rear face of the card, FIGURE 11, contains the necessary explanation of the notches. Thus, the notches 23, labeled *Records*, correspond to the order or the bookkeeping number, the three notches 28 to the year, the notches 24 to the days of the month, and the notches 25 to the month of the year. In this form of the invention any one of the series of notches 23, 24, 25, 28 can be chosen as pertaining to the key word, depending on what chiefly is being sought, and the remaining series of notches as pertaining to the subheadings.

The card and its use are simplicity itself and require only a few words of instruction.

The notches 24 of the card covering the concluding days of the month would be shifted, as shown in dotted line at 29, one notch to the right. Alternatively, it would be possible to include thirty-one notches 24 on a single card, by using narrower notches and/or closer spacing of the notches.

In any of the above forms of the invention it is possible to align the spaces 8 with the notches 9 on the front face of the card, as shown at FIGURE 1, for example, or on the rear face, as shown at FIGURES 8 and 9, for example. However, it must be considered more convenient, when using the key cards with card files, to turn the card over rather than to turn it in its plane through 180°.

It is also possible for the cards of the different embodiments to have only the notches 6, in which case the card is intended only to sort out file cards pertaining to the key words. In this case, by way of example, the area of the card otherwise given over to the spaces 8 can be devoted to an advertisement, comprising an illustration and perhaps a few words. Employing the card with the appropriate pack of file cards will sort out the one or more file cards having information on the illustrated product, service, etc.

I claim:

1. In an information file card system having a series of unsorted file cards each containing information falling within the scope of at least one key word, each file card having along at least one edge thereof holes and at least one notch, which notch corresponds to the information on the card, and each file card having a portion of the edge thereof contoured in a shape for matching similarly contoured edge portions of the other file cards, so that to select from the series of cards all cards having information within the scope of a key word a needle is passed through the apertures and notches in the aligned cards in an appropriate position and the cards notched at that position drop out of the aligned cards and the remainder of the cards are retained on the needle, that improvement comprising, a plurality of key word cards each having a single key word thereon, at least one edge of each key word card in said plurality having therein at least one first notch corresponding to the key word of the card, said notch occupying a unique position on the key word card with respect to the said first notches on the other key word cards, each key word card having a portion of the edge thereof contoured in a shape for matching the similarly contoured portions of the edges of the file cards for correctly orienting each key word card when it is placed against the file cards so that said first notch registers with the notches of all cards in the file cards having information thereon falling within the scope of the respective key word card, said key word cards each having means thereon for visually indicating said at least one first notch, and key word carrying means on each of said key word cards having indicated thereon the key word, said key word carrying means on each card occupying a unique position on the card for the group of key word cards so that each key word card will be visible in said plurality of key word cards when they are properly positioned with respect to each other, whereby the user can find the desired key word card at a glance without having to go through the entire plurality of key word cards and the user can use the respective key word cards with the series of unsorted file cards without knowledge of the coding scheme for positioning the notches.

2. The improvement as claimed in claim 1, wherein said cards each has a cutout along one edge of said card; said key word carrying means comprising a tab for having indicated thereon the key word; and means anchoring said tab to one of a plurality of possible positions along said cutout, wherein in a stack of such cards in random order the symbol on the tab is visible for each card, and thus the desired key word card can be chosen immediately from the stack.

3. The improvement as defined in claim 2, at least one edge of each of said key word cards incorporating at least one second notch relating to a different subheading under the key word and registering, when a key word card is placed on the file card series, with a notch of all cards of the file card series having information falling within the scope of the key word and within the scope of the subheading; and second means, associated with each of said key word cards, for labeling each said second notch with its proper subheading, whereby each said second notch is identifiable and employable with a series of file cards, without the user having knowledge of the coding scheme.

4. The improvement as claimed in claim 1, wherein said key word carrying means has front and rear faces, and each face has a different symbol thereon, whereby each face of the card is associated with a different key word, and means for visually indicating said at least one first notch.

5. The improvement as claimed in claim 4, at least one edge of each of said key word cards having at least one second notch along an edge of said card, said second notch relating to a subheading under each of said two key words; and second means associated with each face of each key word card, for labeling the said second notch with its subheading for the key word associated with that face, whereby said second notch is identifiable and employable with a pack of file cards, without the user having knowledge of the coding scheme.

6. The improvement as claimed in claim 5, in which there are a plurality of said second notches, each relating to a different subheading under each of said two key words and each being labeled with its two subheadings on respective faces of the card.

7. The improvement as defined in claim 1, at least one edge of each of said key word cards incorporating at least one second notch relating to a different subheading under the key word and registering, when the key word card is placed on the file card series, with a notch of all cards of the file card series having information falling within the scope of the key word and within the scope of the subheading; and second means, associated with said card, for labeling each said second notch with its proper subheading, whereby said second notch is identifiable and employable with a series of file cards, without the user having knowledge of the coding scheme.

8. The improvement as defined in claim 1, wherein said key word cards each have a window therein spaced from the edges of each of said key word cards and said key word carrying means comprises a dividing member for having the key word of the respective card indicated thereupon, said dividing members having two ends integral with the card and extending over the space defined by the window, whereby the latter is divided into two completely separated sections, and said dividing members of different key word cards being parallely shifted across the window with respect to the dividing members on the other cards, whereby in the plurality of key word cards in random order, stacked one after the other, the key word is visible for each card, and thus the desired key word card can be chosen immediately from the series.

9. The improvement as defined in claim 8, at least one edge of each of said key word cards incorporating at least one second notch relating to a different subheading under the key word and registering, when the key word card is placed on the filed card series, with a notch of all cards of the file card series having information falling within the scope of the key word and within the scope of the subheading; and second means, associated with each of said key word cards, for labeling each said second notch with its proper subheading, whereby each said second notch is identifiable and employable with a series of file cards, without the user having knowledge of the coding scheme.

10. The improvement as defined in claim 1 in which said key word carrying means comprises for each card a slanting side edge having the key word of the respective card indicated therealong, each such edge of the cards of the plurality of key word cards occupying positions successively transposed across the card face with respect to the card edges on the other cards, whereby each edge occupies a unique position and is visible when the plurality of cards is in order.

11. The improvement as defined in claim 10, at least one edge of each of said key word cards incorporating at least one second notch relating to a different subheading under the key word and registering, when a key word card is placed on the file card series, with a notch of all cards of the file card series having information falling within the scope of the key word and within the scope of the subheading; and second means, associated with each of said key word cards, for labeling each said second notch with its proper subheading, whereby each said second notch is identifiable and employable with a series of file cards, without the user having knowledge of the coding scheme.

References Cited

UNITED STATES PATENTS

| | | | |
|---|---|---|---|
| 623,857 | 4/1899 | Williams | 129—16.5 |
| 673,025 | 4/1901 | Leach. | |
| 759,483 | 5/1904 | Sparrow | 129—16.1 |
| 1,332,954 | 3/1920 | Ringler | 129—16.5 |
| 1,594,888 | 8/1926 | Liedstrand | 129—16.1 |
| 2,225,314 | 12/1940 | McCart. | |

FOREIGN PATENTS

| | | |
|---|---|---|
| 1,150,574 | 8/1957 | France. |
| 1,331,268 | 5/1963 | France. |
| 823,289 | 12/1951 | Germany. |
| 728,325 | 4/1955 | Great Britain. |
| 978,584 | 12/1964 | Great Britain. |
| 377,783 | 7/1964 | Switzerland. |
| 169,721 | 9/1934 | Switzerland. |

OTHER REFERENCES

AEC publication, U.S. Atomic Energy Comm. No. ORO-102, Edge Punched Card for Scientific Literature References, November 1953, pages 6 and 10 to 13.

JEROME SCHNALL, *Primary Examiner.*